United States Patent [19] | [11] 4,282,536
Paschen et al. | [45] Aug. 4, 1981

[54] PROCESS AND APPARATUS FOR AUTOMATIC DRAFTING DEVICES

[75] Inventors: Rolf Paschen, Elmshorn; Rolf Martens, Hamburg, both of Fed. Rep. of Germany

[73] Assignee: Koh-I-Noor Rapidgoraph, Inc., Bloomsbury, N.J.

[21] Appl. No.: 121,336

[22] Filed: Feb. 13, 1980

[30] Foreign Application Priority Data

Apr. 21, 1979 [DE] Fed. Rep. of Germany ....... 2916118

[51] Int. Cl.³ ...................... G01D 15/16; B43L 13/00; B43K 8/00

[52] U.S. Cl. .................................. 346/140 R; 346/1.1

[58] Field of Search ...................... 346/140 R, 49, 1.1

[56] References Cited

U.S. PATENT DOCUMENTS

| | | | |
|---|---|---|---|
| 1,849,084 | 3/1932 | Hand | 346/140 R |
| 3,152,858 | 10/1964 | Wadey | 346/140 R X |
| 3,371,350 | 2/1968 | Sanderson | 346/140 R |
| 3,401,401 | 9/1968 | Read | 346/140 R |
| 3,522,607 | 8/1970 | Felton | 346/140 R |
| 3,708,798 | 1/1973 | Hildenbrand | 346/140 R |
| 3,950,762 | 4/1976 | Anderka | 346/140 R |
| 4,097,874 | 6/1978 | Anderka | 346/140 R |
| 4,173,020 | 10/1979 | Anderka | 346/140 R |
| 4,188,634 | 2/1980 | Anderka | 346/140 R X |

FOREIGN PATENT DOCUMENTS 2741311 3/1979 Fed. Rep. of Germany .

*Primary Examiner*—Joseph W. Hartary
*Attorney, Agent, or Firm*—David H. Semmes; Warren E. Olsen

[57] ABSTRACT

Process and apparatus for drawing with several tube pens which may, alternatively, be brought into contact with a drawing surface, to draw different line widths. The tube pens are connected to an ink supply delivery mechanism which ensures that the writing fluid pressure in each tube pen is kept at a given value. The ink supply delivery mechanism supplies writing fluid to that tube pen having the finest line width, and excess writing fluid flows successively therefrom through an overflow, and to successively lower overflows of the tube pens with the next largest line widths, finally reaching the tube pen with the broadest line width, and eventually, by way of a storage container, to the ink supply delivery mechanism.

6 Claims, 2 Drawing Figures

PROCESS AND APPARATUS FOR AUTOMATIC DRAFTING DEVICES

BACKGROUND OF THE INVENTION

1. Field of the Invention

A process and apparatus for controlling the delivery of drawing ink to an automatic drawing or drafting machine, and particularly a machine having a plurality of selectively controlled tubular writing pens, for drafting different line widths.

2. Description of the Prior Art

In an earlier procedure of this type, (German P No. 27 41 311) (U.S. Ser. No. 907,536, now U.S. Pat. No. 4,188,634), the ink level in an intermediate chamber was controlled by comparing an actual value with a theoretical value. The intermediate chamber was connected with both the ink delivery mechanism and the stylographic, or tube, pens in such a manner that a static ink pressure resulted in the writing tubes of the attached tube pens, which pressure was determined by the ink level of the intermediate chamber.

Even though this earlier procedure functioned satisfactorily, it required nontheless a relatively complex switching process to compare the actual value with the theoretical value and to correspondingly activate the ink delivery mechanism. Beyond that, it established the same static ink pressure for all tube pens. It is, however, also known that the static ink pressure must be adjusted to correspond to the line width of the tube pen in order to achieve optimal results, i.e., the narrow width tube pen should have a greater static pressure at its tube writer than a wide width tube pen.

The object of the invention is, therefore, to provide a simple means of individually adapting the static ink pressure in a number of tube pens to the line width of each tube pen.

The solution to this object is provided by maintaining a constant static pressure for each pen, as a function of its line width. The preferred embodiments of the invention employ a process by which the ink delivery mechanism provides ink to the tube pen with the smallest line width, which ink in turn flows through an overflow located at a predetermined height, and successively to tube pens with overflows at lower levels, and progressively greater line widths, and finally, as necessary, through a supply chamber back to the ink delivery mechanism. The ink delivery system functions preferably continuously.

BRIEF SUMMARY OF THE INVENTION

In the process taught according to the invention, individual tube pens are filled to a level corresponding to a desired static ink pressure and this ink level is maintained by correspondingly located overflows, which allow ink to flow downwardly from the tube pen with the narrowest line width, and then, as noted above, so that when one or more tube pens are used and ink is expended, the static ink pressure in each pen is always maintained constant.

The invention further concerns improvements in a drawing instrument, and particularly for automatic drawing systems, wherein several tube pens have writing tubes of varying line widths, which can be selectively lowered to a drawing base. The improved instrument also has an ink delivery mechanism characterized by the fact that the outlet of the ink delivery mechanism is connected by means of overflows whose distance from the front end of each writing tube decreases as the line width of the tube pens increases.

The overflow of the tube writer with the greatest line width is connected with the inlet of the ink delivery mechanism, i.e., with the attached ink supply chamber.

To facilitate both lowering the tube pens into a drawing position, and raising them into the storage position, and also to prevent impairment of these actions in the case of tube pens whose ink chambers are connected by overflows according to the present invention, the overflows can each consist of a rigid tube section which extends into the ink chamber of the adjacent tube writer. There can also be a slot extending axially, in the wall of the ink chamber of the adjacent tube pen, at the height of that tube section. The length of this slot is greater than the stroke of the tube pen so that the overflow, i.e., the rigid tube section, can move in the slot in the adjacent tube writer when the tube writer with the overflow is moved.

Another embodiment of a drawing instrument according to the present invention is characterized by the fact that the ink chambers, and the overflows, are held stationary, wherein the tube pens are axially moveable even though interconnected among their ink chambers.

Further features of the invention are explained in greater detail hereinbelow, wherein reference is made to the schematically simplified drawings of preferred embodiments.

DESCRIPTION OF THE PREFERRED EMBODIMENTS

Figure 1:
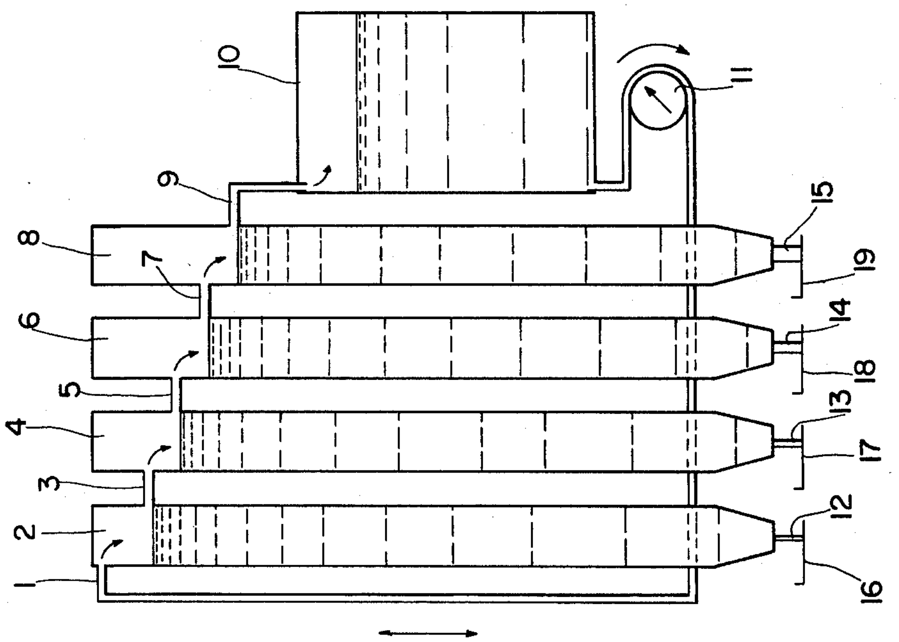
FIG. 1 schematically shows the principles of the drawing instrument, according to the present invention wherein the ink chambers and the tube pens are connected with one another.

In FIG. 1, four tube writers 2, 4, 6, and 8 are schematically shown, with writing tubes 12, 13, 14, and 15 which will draw varying line widths. Writing tube 12 has the smallest diameter width and writing tube 15 has the greatest diameter, i.e., these tubular stylographic pens will respectively draw the smallest and largest line widths. These tube pens are illustrated to be in the storage position, with the tips of each shown closed by seal elements 16, 17, 18 and 19. Exemplary structure for holding the tube pens in a storage position, and moving them along with the ink chambers and engaging the seal elements may be exactly as taught in German Pat. No. AS 27 50 937 (U.S. Pat. No. 4,173,020), incorporated herein by reference.

The ink delivery mechanism comprises a continually operating pump 11 which is connected with an ink chamber formed in the upper end of the one part of the tube pen, 2, by means of an inlet conduit, 1. This enables the tube pen to be lowered into drawing position. An overflow, 3, in the form of a rigid tube section, is located somewhat lower than the connection of the inlet conduit 1 and leads from this tube pen into the ink chamber of the adjacent tube pen, 4. This outlet side of the first overflow, 3, extends through an axially extending slot (not shown) in the wall of the adjacent tube pen, 4, so that the first overflow, 3, can be moved down simultaneously with the downward movement of the first tube pen, 2, into a writing position.

Correspondingly, a second overflow, 5, is located somewhat below the first overflow, 3, and leads from the ink chamber of the second tube pen, 4, into the ink chamber of its adjacent tube pen, 6. Thereafter, the ink chamber of tube pen, 6, has an overflow, 7, which is below overflow, 5, and leads into the ink chamber of tube pen, 8, and from this pen an overflow, 9, is located below overflow, 7. The last overflow, 9, is connected directly with an ink supply chamber, 10, from which ink is recycled to ink conduit, 1, by the pump, 11.

The heights of the individual overflows are selected so that the stated ink level in each tube pen, as determined by the height of each overflow, will create the desired static ink pressure at the tip of the writing tube of that pen. Thus, one can work the machine at high speed, without a given pen dripping while in its storage position, and also without incomplete line coverage from any pen which is doing very rapid drawing. Since the pump, 11, continuously delivers ink, these ink levels in the individual pen ink chambers are maintained constant, i.e., the ink always remains exactly at the level of the lower edge of the associated overflow of the individual tube pen.

Figure 2:
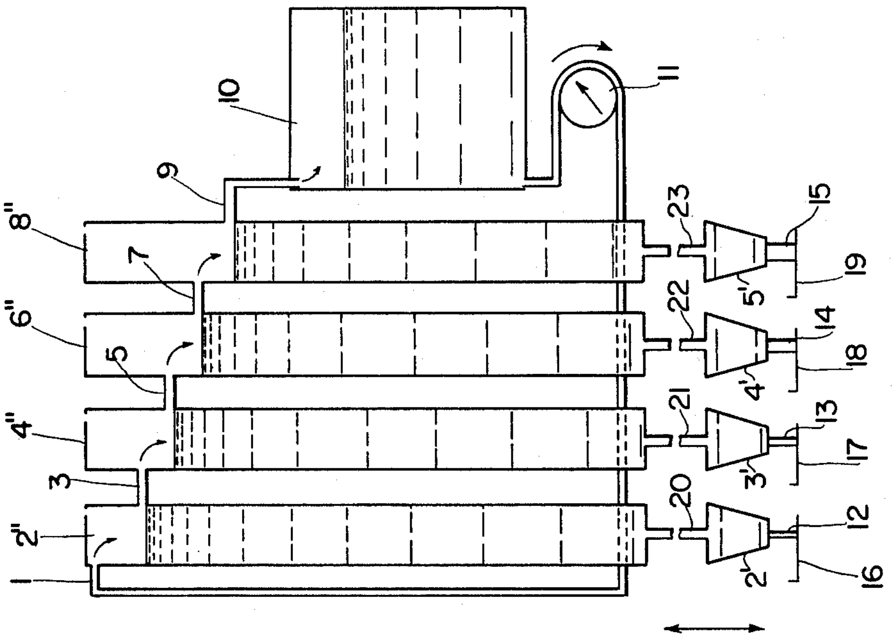
FIG. 2 schematically shows a drawing instrument according to a second embodiment which is substantially similar to FIG. 1 wherein the tube pens are moveable in relation to the ink chambers.

The drawing instrument schematically shown in FIG. 2 corresponds in its function and essentially in its construction, with the drawing instrument of FIG. 1, therefore, identical parts are designated by identical reference numbers, with primed numerals to differentiate similar parts.

The only difference between the function of the drawing instrument embodiment schematically illustrated in FIG. 2, and the drawing embodiment of FIG. 1, lies in the fact that, with the drawing instrument in FIG. 2, the ink chambers 2″, 4″, 6″, and 8″ and the associated overflows 3, 5, 7, and 9 are held stationary during use and are connected with the tube pens 2′, 3′, 4′, 5′ by means of moveable connections, for example, flexible tubes 20, 21, 22, 23. These tube pens can, for example, be lowered from their closed storage positions into the drawing position and raised again while they remain connected with the associated ink chambers, all as more particularly described in German Pat. No. AS 27 50 937 (U.S. Pat. No. 4,173,020) as noted hereinbefore.

The illustrated embodiments of a process and apparatus according to the principles of the present invention are exemplary, and the invention is to be measured by the scope of the appended claims.

We claim:

1. In a process for drawing with a plurality of tube pens, which can be selectively brought into contact with a drawing surface, the improvement comprising a writing fluid delivery mechanism which maintains the writing fluid in the tube pens at predetermined values, characterized by the steps of a writing fluid delivery mechanism which initially feeds writing fluid to the tube pen with the smallest line width, so that excess writing fluid flows therefrom by means of an overflow, located at a first predetermined height, and then to at least one additional tube pen, with a progressively greater line width and an overflow at a second height, which is lower than said first height, said ink ultimately overflowing from the pen with the greatest line width and through a storage container and ultimately back to said initial feeding step.

2. A process according to claim 1, wherein the writing fluid delivery mechanism continually feeds said ink, in a recycling manner.

3. In a drawing instrument, such as for automatic drawing systems and the like, further characterized by several tube pens having writing tubes of varying line widths which can be selectively lowered upon a writing base, and a writing fluid delivery mechanism, the improvement comprising having the outlet (1) of the writing fluid delivery mechanism (11) directly connected with the writing fluid chamber of that tube pen (2) having the smallest line width, and the writing fluid chambers of the additional tube pens (2, 4, 6, 8) mutually connected, in series, by means of overflows from each pen (3, 5, 7) wherein the distance of each overflows from the forward end of each tube pen (12, 13, 14, 15) decreases as the line width of the tube pens (2, 4, 6, 8) progressively increases.

4. An improved drawing instrument according to claim 3, wherein the overflow (9) of the writing fluid chamber for the tube pen (8) with the greatest line width is connected with a writing fluid supply chamber attached to the inlet of the writing fluid delivery mechanism.

5. An improved drawing instrument according to either claim 3 or 4, wherein each of said tube pens, in combination with its associated writing fluid chamber, is operable to be raised or lowered, wherein further, each overflow comprises a rigid tube section (3, 5, 7, 9) which respectively extends from a given tube pen into the writing fluid chamber of the adjacent tube pen, and a slot is provided in the wall of the writing fluid chamber of each adjacent tube pen, said slot extending axially from the level of the tube section, wherein the length of said slot is greater than the axial stroke of said given tube pen.

6. An improved drawing instrument according to either of claims 3 or 4, wherein the writing fluid chambers (2″, 4″, 6″, 8″) and the overflows (3, 5, 7, 9) of each pen are held stationary, characterized in that each tube (2′, 3′, 4′, 5′) is moveable in the axial direction while in fluid communication with its stationary writing fluid chamber.

* * * * *